US012508502B2

(12) United States Patent
Stolp et al.

(10) Patent No.: US 12,508,502 B2
(45) Date of Patent: Dec. 30, 2025

(54) EMBEDDED SPEEDRUN TIMER

(71) Applicant: Sony Interactive Entertainment LLC, San Mateo, CA (US)

(72) Inventors: Nathan Allen Stolp, San Diego, CA (US); Romie John Quinto, Escondido, CA (US); Ritchard Markelz, Temecula, CA (US)

(73) Assignee: Sony Interactive Entertainment LLC

( * ) Notice: Subject to any disclaimer, the term of this patent is extended or adjusted under 35 U.S.C. 154(b) by 259 days.

(21) Appl. No.: 18/101,776

(22) Filed: Jan. 26, 2023

(65) Prior Publication Data

US 2024/0252918 A1 Aug. 1, 2024

(51) Int. Cl.

| | |
|---|---|
| ***A63F 13/44*** | (2014.01) |
| ***A63F 13/75*** | (2014.01) |
| ***A63F 13/77*** | (2014.01) |
| ***A63F 13/798*** | (2014.01) |
| *A63F 13/45* | (2014.01) |

(52) U.S. Cl.

CPC .............. *A63F 13/44* (2014.09); *A63F 13/75* (2014.09); *A63F 13/77* (2014.09); *A63F 13/798* (2014.09); *A63F 13/45* (2014.09); *A63F 2300/5586* (2013.01)

(58) Field of Classification Search

CPC .......... A63F 13/95; A63F 13/86; A63F 13/77; A63F 13/79; A63F 13/52; A63F 13/49; A63F 13/45; A63F 13/30; A63F 13/847; A63F 13/798; A63F 13/497; A63F 13/44; A63F 13/35; A63F 13/335; A63F 13/75; A63F 2300/5586

See application file for complete search history.

(56) References Cited

U.S. PATENT DOCUMENTS

| | | | | |
|---|---|---|---|---|
| 8,622,837 | B2 * | 1/2014 | Harris | A63F 13/75 463/40 |
| 10,268,660 | B1 * | 4/2019 | Arazi | A63F 13/75 |
| 10,486,070 | B2 * | 11/2019 | Fukuda | A63F 13/798 |
| 10,933,323 | B2 * | 3/2021 | Anand | A63F 13/33 |
| 11,049,131 | B2 * | 6/2021 | Miyazaki | G06F 8/61 |

(Continued)

OTHER PUBLICATIONS

International Search Report and Written Opinion received in International Application No. PCT/US24/10539, dated Apr. 11, 2024, in 8 pages.

*Primary Examiner* — William H Mcculloch, Jr.

(74) *Attorney, Agent, or Firm* — Kilpatrick Townsend & Stockton LLP

(57) ABSTRACT

Providing a speedrun timer on a platform, including: initiating a speedrun on the platform by a player using an option in settings of the platform; selecting at least one of installed imports of rulesets and default imports of rulesets; selecting at least one of installed rules and default rules; downloading one of the at least one of selected imports of rulesets or the at least one of the selected rules; starting the speedrun; determining whether at least one of the selected rules have been broken by the player; applying one of time or input-related punishment when it is determined that the at least one of the selected rules have been broken; determining whether criteria of the at least one of the selected rules and the at least one of the installed imports of rulesets are met; and terminating the speedrun when it is determined that the criteria are met.

20 Claims, 4 Drawing Sheets

(56) References Cited

U.S. PATENT DOCUMENTS

| | | | | |
|---|---|---|---|---|
| 11,305,196 | B1 * | 4/2022 | Gluck | A63F 13/352 |
| 11,458,405 | B1 * | 10/2022 | Welch | H04L 67/131 |
| 11,559,746 | B1 * | 1/2023 | Caballero | A63F 13/497 |
| 12,097,436 | B2 * | 9/2024 | Neuenfeldt | H04N 5/76 |
| 2007/0238528 | A1 * | 10/2007 | Harris | G07F 17/3241<br>463/42 |
| 2016/0110754 | A1 * | 4/2016 | Miyazaki | G06Q 30/0241<br>705/14.39 |
| 2017/0007929 | A1 * | 1/2017 | Fukuda | A63F 13/44 |
| 2019/0009174 | A1 * | 1/2019 | Anand | A63F 13/50 |
| 2019/0262723 | A1 * | 8/2019 | Trombetta | A63F 13/847 |
| 2020/0356381 | A1 * | 11/2020 | Gyrling | G06F 8/61 |
| 2022/0358450 | A1 * | 11/2022 | Stephens | H04L 9/3213 |
| 2024/0252918 | A1 * | 8/2024 | Stolp | A63F 13/77 |

* cited by examiner

EMBEDDED SPEEDRUN TIMER

BACKGROUND

Field

The present disclosure relates to speedrun timers, and more specifically, to implementing an embedded speedrun timer on a platform or server.

Background

Conventional speedrun games are typically presented in the form of races against other top competitors. However, issues with the conventional speedrun games include disadvantages of the long lead time for game developers to implement speedrun timers for the games and the extensive research to make the timer not interfere with the performance of the game. Accordingly, there is a need to implement an embedded speedrun timer on the platform or server side.

SUMMARY

The present disclosure provides for implementing an embedded speedrun timer on a platform and/or server.

In one implementation, a method for providing a speedrun timer on a platform is disclosed. The method includes (1) initiating a speedrun on the platform by a player using an option in settings of the platform, (2) selecting at least one of installed imports of rulesets and default imports of rulesets, (3) selecting at least one of installed rules and default rules, and (4) downloading one of the at least one of selected imports of rulesets or the at least one of the selected rules. The method also includes (1) starting the speedrun, (2) determining whether at least one of the selected rules have been broken by the player, (3) applying one of time or input-related punishment when it is determined that the at least one of the selected rules have been broken, and (4) determining whether criteria of the at least one of the selected rules and the at least one of the installed imports of rulesets are met. The method further includes terminating the speedrun when it is determined that the criteria are met.

In another implementation, a speedrun timer system for providing a speedrun to be initiated by a player using an option in settings of a platform includes an import selector, a rule selector, a downloader, and a speedrun processor. The import selector selects at least one of installed imports of rulesets and default imports of rulesets. The rule selector selects at least one of installed rules and default rules. The downloader downloads one of the at least one of selected imports of rulesets or the at least one of the selected rules. The speedrun processor then (1) starts the speedrun, (2) determine whether at least one of the selected rules have been broken by the player, (3) apply one of time or input-related punishment when it is determined that the at least one of the selected rules have been broken, (4) determine whether criteria of the at least one of the selected rules and the at least one of the installed imports of rulesets are met; and (5) terminate the speedrun when it is determined that the criteria are met.

In yet another implementation, a non-transitory computer-readable storage medium storing a computer program to provide a speedrun timer on a platform is disclosed. The computer program includes executable instructions that cause a computer to: initiate a speedrun on the platform by a player using an option in settings of the platform; select at least one of installed imports of rulesets and default imports of rulesets; select at least one of installed rules and default rules; download one of the at least one of selected imports of rulesets or the at least one of the selected rules; starting the speedrun;

determining whether at least one of the selected rules have been broken by the player; apply one of time or input-related punishment when it is determined that the at least one of the selected rules have been broken; determine whether criteria of the at least one of the selected rules and the at least one of the installed imports of rulesets are met; and terminate the speedrun when it is determined that the criteria are met.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, the conventional speedrun games have issues with (1) the long lead time for game developers to implement speedrun timers for the games and (2) the extensive research to make the timer not interfere with the performance of the game.

To address the issues with the conventional speedrun games, certain implementations of the present disclosure provide for implementing an embedded speedrun timer on a platform and/or server (e.g., a game console). In one implementation, the speedrun timer is used to manage speedrun times through the platform and/or server itself. That is, the speedrun timer may manage speedrun times within a computer system specially made for playing video games. Thus, the platform speedrun timer enables players to capture the speedrun data from any game title without requiring support or additional hardware in capturing the speedrun data.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Figure 1A:
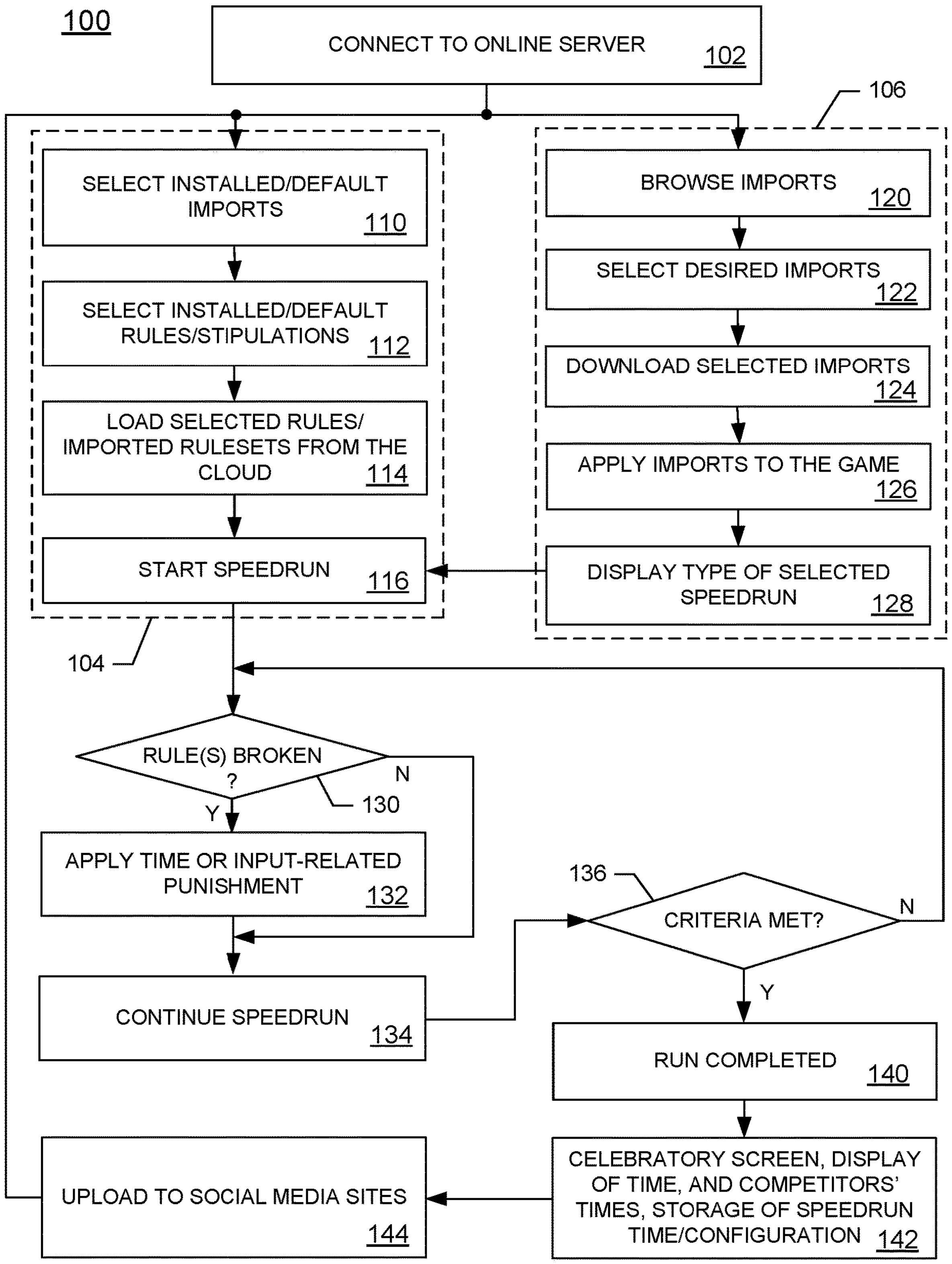
FIG. 1A is a flow diagram of a process for providing a speedrun timer on a platform in accordance with one implementation of the present disclosure.

FIG. 1A is a flow diagram of a process 100 for providing a speedrun timer on a platform in accordance with one implementation of the present disclosure. As stated above, the speedrun timer of the present disclosure may be used to manage speedrun times through the platform and/or server. That is, the speedrun timer manages speedrun times within a computer system specially made for playing video games. Thus, the platform speedrun timer may be used to capture the speedrun data from any game title without requiring support or additional hardware in capturing the speedrun data. In one implementation, the speedrun is initiated on the platform using an option in the settings of the platform. In one implementation, the speedrun data is captured using the platform and stored on servers that are accessed over the Internet ("the cloud").

In the illustrated implementation of FIG. 1A, the speedrun timer goes into import settings and connects to the online server, at step 102. At this point in the process 100, the speedrun timer selects either a path through block 104 or block 106 depending on whether the player (1) selects a pre-determined/default import (s), wherein specific speedruns are downloaded [block 104] or (2) selects an external import and downloads it [block 106].

In one implementation, at block 104, the speedrun timer selects, at step 110, installed and/or default imports saved on the back-end server. The selected imports may include types of runs, player submitted templates, and developer challenges. For example, the selected imports may provide for: (1) left-handed players in which all inputs are flipped; (2) level-based speedruns where a level or stage is completed as quickly as possible; (3) speedruns with inputs doubled (e.g., shooting twice with one input); (4) speedruns with inputs disabled (e.g., the circle button is disabled so that pushing it does not do anything); (5) infinite health for a player or enemy; (6) speedruns without being seen by enemies; (7) developer-sourced speed runs (e.g., challenges given to the communities by developers); (8) speedruns in which all clips are emptied as soon as possible; and (9) other related imports which are similarly configured as those enumerated above.

The speedrun timer may then select, at step 112, installed and/or default rules and stipulations. For example, the selected rules/stipulations may provide for out of the box rules such as: (1) allowing no shooting; (2) allowing no sprinting; (3) using only secondary weapon; (4) allowing only hip-fire; (5) allowing jumping only; (6) allowing no crafting of any items; (7) allowing driving backwards only; (8) allowing no assistance from friendly non-player characters; and (9) other related rules/stipulations which are similarly configured as those enumerated above. The speedrun timer may then load the selected rules and/or imported rulesets from the cloud, at step 114, and start the speedrun, at step 116. Specific rule or rules are selected (e.g., speed-run rule: taking no damage), while a ruleset is an already pre-determined selection of rules usually determined by the community. For example, a ruleset may be determined as a result of the community agreeing upon what makes a good, competitive speedrun goal, which can be for block 104 and/or 106.

In an alternative implementation, at block 106, the desired imports are (1) browsed, at step 120, (2) selected for download or streaming, at step 122, and (3) downloaded, at step 124. In one implementation, the imports are browsed on the platform software development kit (SDK), the database, and/or the cloud. The speedrun timer may then (1) apply the imports to a game, at step 126, (2) display the selected type of speedrun, at step 128, and (3) start the speedrun, at step 116.

The above-described implementations may make the speedruns accessible to wider audience and may garner attention from the speedrun community which has gained a large following. In one implementation, the process 100 includes a timer for speedruns and programmable splits (which can be modified), and is available to be used on any game title. Since speedruns may often involve racing, the players are put head-to-head in a game title to determine the fastest time. Thus, in one implementation, the speedrun timer process 100 includes a safeguard to ensure that (1) all variables are accounted for, (2) the timer starts at the same time, and (3) the players are provided the fairest run possible.

In the illustrated implementation of FIG. 1A, the process 100 further determines, at step 130, whether rule (s) have been broken by the player. If it is determined, at step 130, that rule(s) were broken, a time or input-related punishment is applied, at step 132. The input-related punishment may include, for example, (1) flipping all inputs (as if for a left-handed player), (2) having to complete a level or stage as quickly as possible (level-based speedruns), (3) doubling inputs of speedruns (e.g., shooting twice with one input), (4) disabling inputs of speedruns (e.g., the circle button is disabled so that pushing it does not do anything), and/or (5) giving a player a time penalty (e.g., unable to use (input) the sprint button for 5 seconds if damage taken) that adds to overall speedrun time. The speedrun then continues, at step 134.

At step 136, a determination is made whether the criteria are met. If it is determined, at step 136, that the criteria are not met, the process returns to step 130. In one implementation, the criteria include the selected rule or rulesets. For example, if the rule stipulates that the player must not take damage, but the player takes damage, then the player is given an input penalty (e.g., unable to sprint, which adds time to finish the speedrun). If the player continues to take damage and breaks the rule, the input penalties continue and the overall time to complete the speedrun increases. If the player does not take damage after the penalty is implemented within a period of time, the player is able to continue the speed-run (step 134) and receive a final time with a celebratory message. Thus, if it is determined, at step 136, that the criteria are met, the process 100 for the speed-run timer is terminated, at step 140, meaning the run is completed.

In the illustrated implementation of FIG. 1A, once the process 100 for the speedrun timer is terminated and the run is completed, at step 140, the speedrun timer may display (1) celebratory screen, (2) the speedrun times of the player, and/or (3) the speedrun times of the competitors, at step 142. The speedrun timer may also store the speedrun data including speedrun times, configurations, and/or media data (e.g., on the cloud). In one implementation, the stored times, configurations, and media data (including video) are then uploaded to the social media sites, at step 144.

Figure 1B:
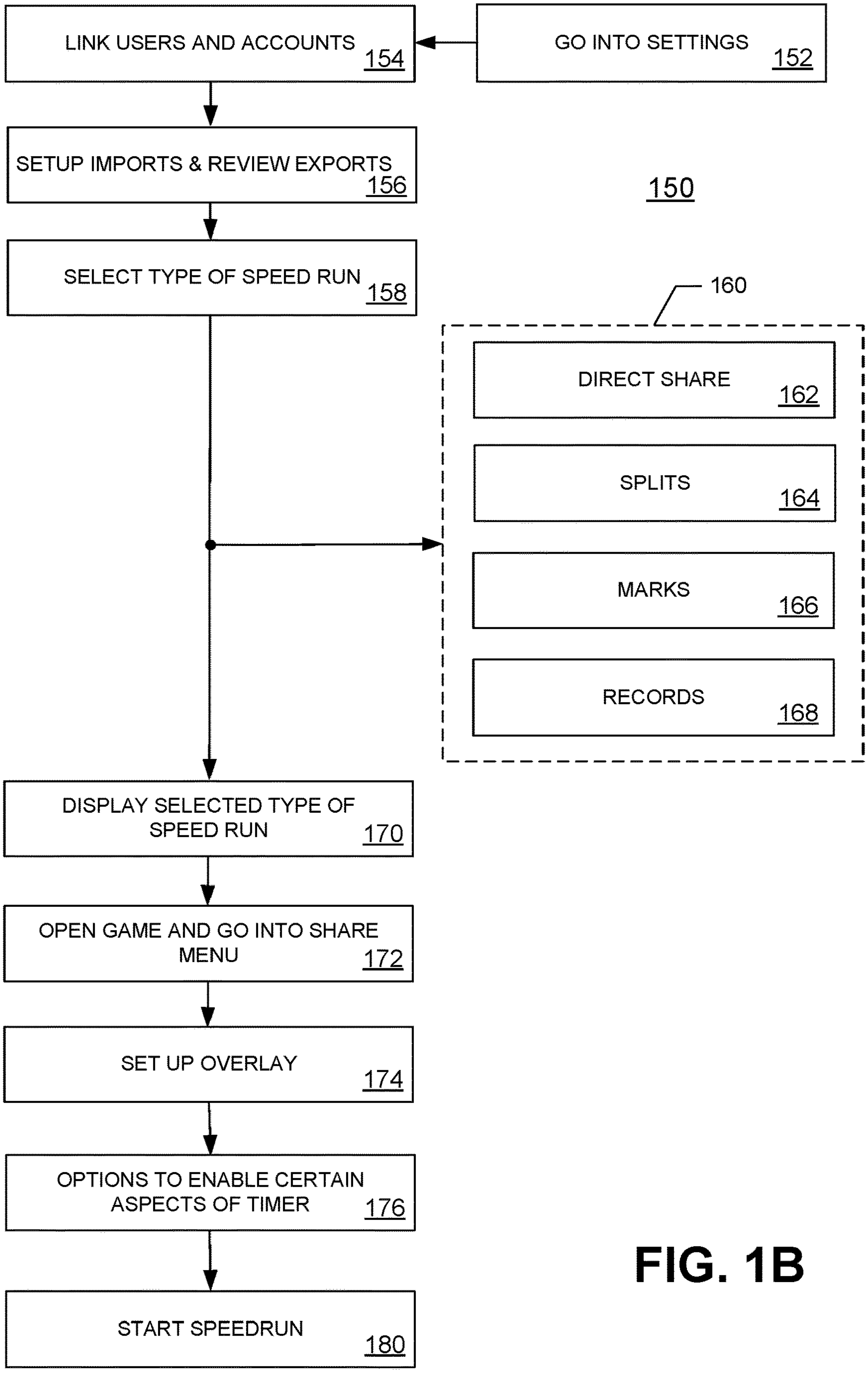
FIG. 1B is a flow diagram of a process for setting up a speedrun on a platform in accordance with one implementation of the present disclosure.

FIG. 1B is a flow diagram of a process 150 for setting up a speedrun on a platform in accordance with one implementation of the present disclosure. In one implementation, the process 150 includes one of block 104 or 106 shown in FIG. 1A.

In the illustrated implementation of FIG. 1B, (1) platform settings are entered, at step 152, (2) users and accounts are linked, at step 154, and the imported rules are set up and the exports are reviewed (e.g., video on demand (VOD) review of the exported/saved games), at step 156.

In the illustrated implementation of FIG. 1B, the setup also includes selecting a type of speedrun, at step 158, which is categorized into at least four types shown in block 160. In one implementation, the selection of a type of speedrun includes selecting one of the categories and specific rule within those categories: (1) direct share 162, (2) splits 164, (3) marks 166, and (4) records 168. The direct share, at block 162, includes live streaming or direct sharing of the speedrun in real-time. The splits, at block 164, include listing or posting of the status of the current run compared to the previous run (s). The splits also include setting up a specific section of a gameplay to be timed. A runner may use specialized timing software to split the run into continuous sections so that the run can be tracked to determine whether the runner is doing well, so-so, or terrible. The runner then advances the timer to the next split, e.g., next key point in game, pre-planned routes, next chapter, how far ahead/behind the runner is for the viewer. The marks, at block 166, include defining mark time indicator to define goals to improve on times for the run (s). The records, at block 168, include posting top times for the run(s), getting platinum, gold, silver, or bronze medal, and/or levels of accomplishments to beat (e.g., score/time/percentage).

Once the setup is complete, at block 160, the process 150 proceeds to display the selected type of speed run for user confirmation, at step 170. In this step, the times of the player as well as those of friends and other competitors may be displayed. In one implementation, the process 150 then proceeds to: (1) open the game and go into share menu, at step 172, which is performed once the speedrun type is selected; (2) setup the overlay, at step 174, which shows the details of the information for the speedrun (e.g., a time clock is selected and the time is overlayed on the screen, the timer can be set to a preferred orientation and real estate of the screen, timer and screen orientation is where the clock sits on screen); (3) provide options to enable certain aspects of the timer, at step 176, and select what to display (e.g., timer, splits, type of speedrun) and where to display each aspect on the screen (e.g., top left, top middle, top right, bottom left, bottom middle, bottom right) or not to display; and (4) start the speedrun, at step 178.

Figure 2:
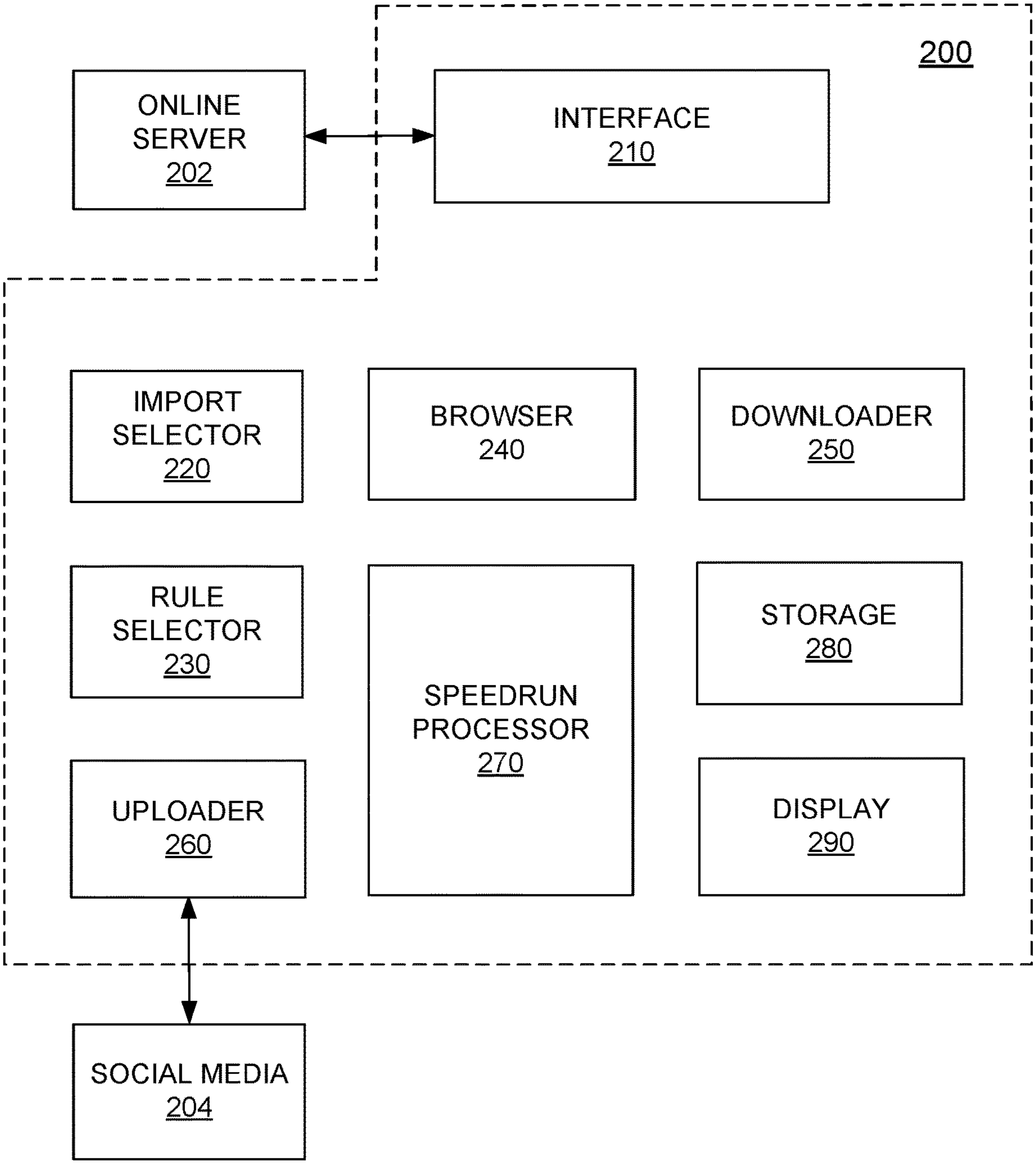
FIG. 2 is a block diagram of a speedrun timer system for providing a speedrun timer on a platform in accordance with one implementation of the present disclosure.

FIG. 2 is a block diagram of a speedrun timer system 200 for providing a speedrun timer on a platform in accordance with one implementation of the present disclosure. In the illustrated implementation of FIG. 2, the system 200 includes an interface 210, an import selector 220, a rule selector 230, a browser 240, a downloader 250, an uploader 260, a speedrun processor 270, a storage unit 280, and a display 290. In one implementation, blocks 210 through 290 of the system 200 are configured entirely with hardware including one or more digital signal processors (DSPs), general purpose microprocessors, application specific integrated circuits (ASICs), field programmable logic arrays (FPGAs), or other equivalent integrated or discrete logic circuitry.

In one implementation, the speedrun timer system 200 is used to manage speedrun times through the platform and/or server. Thus, the platform speedrun timer system 200 may be used to capture the speedrun data from any game title without requiring support or additional hardware in capturing the speedrun data. In one implementation, the speedrun is initiated on the speedrun timer system 200 of the platform using an option in the settings of the platform. In one implementation, the speedrun data is captured using the system 200 of the platform and stored on servers that are accessed over the Internet ("the cloud").

In the illustrated implementation of FIG. 2, the speedrun timer system 200 goes into import settings and connects to the online server 202.

In one implementation, the import selector 220 selects installed and/or default imports. The selected imports may include types of runs, player submitted templates, and developer challenges. For example, the selected imports may provide for: (1) left-handed players in which all inputs are flipped; (2) level-based speedruns where a level or stage is completed as quickly as possible; (3) speedruns with inputs doubled (e.g., shooting twice with one input); (4) speedruns with inputs disabled (e.g., the circle button is disabled so that pushing it does not do anything); (5) infinite health for a player or enemy; (6) speedruns without being seen by enemies; (7) developer-sourced speed runs (e.g., challenges given to the communities by developers); (8) speedruns in which all clips are emptied as soon as possible; and (9) other related imports which are similarly configured as those enumerated above.

In one implementation, the rule selector 230 selects installed and/or default rules and stipulations. For example, the selected rules/stipulations may provide for out of the box rules such as: (1) allowing no shooting; (2) allowing no sprinting; (3) using only secondary weapon; (4) allowing only hip-fire; (5) allowing jumping only; (6) allowing no crafting of any items; (7) allowing driving backwards only; (8) allowing no assistance from friendly non-player characters; and (9) other related rules/stipulations which are similarly configured as those enumerated above. The downloader 250 may download the imported rulesets and rules selected by the import selector 220 and the rule selector 230, respectively, from the online server 202. The speedrun processor 270 then starts the speedrun.

In an alternative implementation, (1) the browser 240 enables a player to browse the desired imports, (2) the import selector 220 selects the desired imports for download or streaming, and (3) the downloader 250 downloads the imports selected by the import selector 220 from the online server 202. In one implementation, the imports are browsed on the platform SDK, the database, and/or the cloud. The speedrun processor 270 may apply the imports to a game and display the selected type of speedrun on the display 290, and (3) start the speedrun, at step 116. The speedrun processor 270 then starts the speedrun.

In the illustrated implementation of FIG. 2, once the speedrun is started, the speedrun processor 270 checks whether rule (s) have been broken by the player. If it is determined that rule (s) were broken, the speedrun processor 270 applies a time or input-related punishment to the player. The speedrun processor 270 also checks whether the criteria are not met. If the speedrun processor 270 determines that the criteria are met, the speedrun processor 270 terminates the speedrun. Otherwise, if the speedrun processor 270 determines (1) that rule (s) were not broken, or (2) that the criteria were not met, then the speedrun processor 270 continues the speedrun. The speedrun processor 270 also checks whether the criteria and ruleset are met. If the speedrun processor 270 determines that the criteria and ruleset are met, the speedrun is terminated by the speedrun processor 270. Otherwise, if the speedrun processor 270 determines that the criteria and ruleset are not met, then the speedrun processor 270 continues the speedrun.

In the illustrated implementation of FIG. 2, once the speedrun is terminated the speedrun processor 270, the display unit 290 displays (1) celebratory screen, (2) speedrun time of the player, and/or (3) speedrun times of the competitors. The speedrun processor 270 may also store the speedrun times, configurations, and/or media data locally on the storage unit 280 or on the cloud. The uploader 260 may then upload the stored times, configurations, and media data (including video) to the social media sites 204.

Figure 3A:
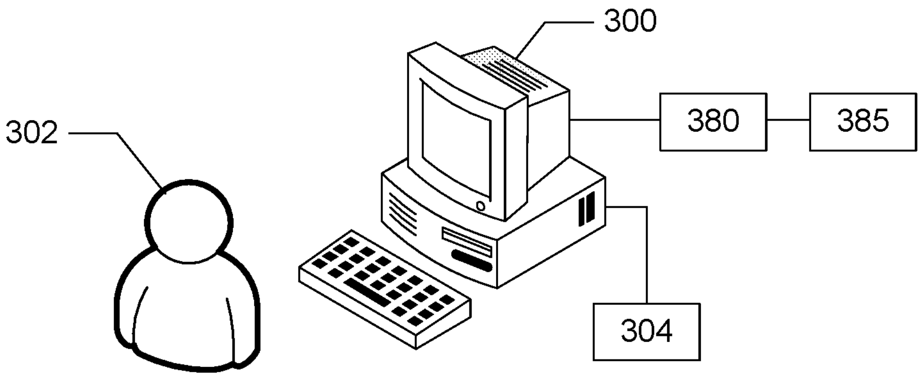
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement a speedrun timer application 390 as illustrated and described with respect to the method 100 and the system 200 in FIGS. 1 and 2. In one implementation, the computer system 300 includes one of game console, gaming computer, or other electronic device that outputs a video signal to display a video game that can be played with a game controller.

Figure 3B:
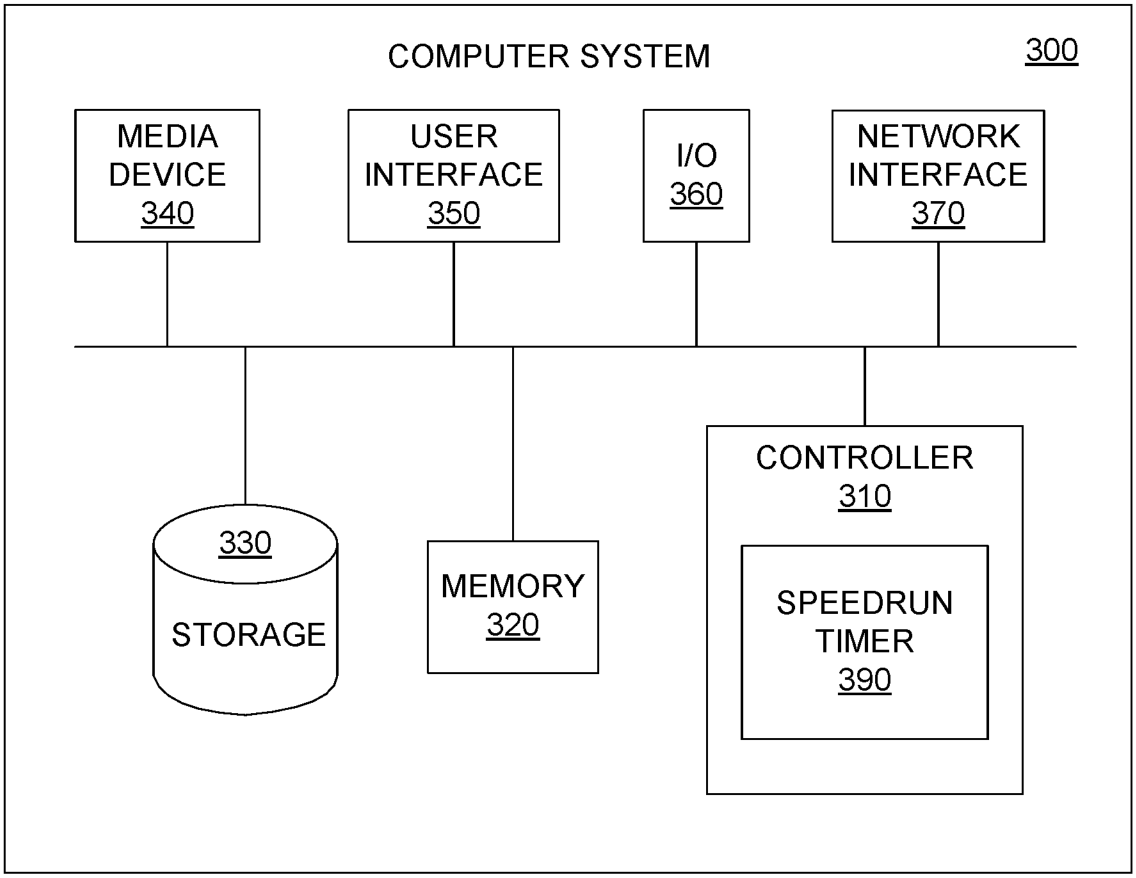
FIG. 3B is a functional block diagram illustrating the computer system hosting the speedrun timer application in accordance with an implementation of the present disclosure.

The computer system 300 stores and executes the speedrun timer application 390 of FIG. 3B. In addition, the computer system 300 may be in communication with a software program 304. Software program 304 may include the software code for the speedrun timer application 390.

Software program 304 may be loaded on an external medium such as a CD, DVD, or a storage drive, as will be explained further below.

Furthermore, computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the speedrun timer application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the speedrun timer application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the speedrun timer application 390 with a software system, such as to enable the creation and configuration of engines and data extractors within speedrun timer application 390.

Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the speedrun timer application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

In one particular implementation, a method for providing a speedrun timer on a platform is disclosed. The method includes (1) initiating a speedrun on the platform by a player using an option in settings of the platform, (2) selecting at least one of installed imports of rulesets and default imports of rulesets, (3) selecting at least one of installed rules and default rules, and (4) downloading one of the at least one of selected imports of rulesets or the at least one of the selected rules. The method also includes (1) starting the speedrun, (2) determining whether at least one of the selected rules have been broken by the player, (3) applying one of time or input-related punishment when it is determined that the at least one of the selected rules have been broken, and (4) determining whether criteria of the at least one of the selected rules and the at least one of the installed imports of rulesets are met. The method further includes terminating the speedrun when it is determined that the criteria are met.

In one implementation, at least one of selected imports of rulesets includes at least one of: types of runs; submitted templates of the player; and challenges of developers. In one implementation, the at least one of selected imports of rulesets includes providing for: left-handed players in which all inputs are flipped; level-based speedruns where a level or stage is completed as quickly as possible; speedruns with inputs doubled; speedruns with inputs disabled; infinite health for a player or enemy; speedruns without being seen by enemies; developer-sourced speed runs; and speedruns in which all clips are emptied as soon as possible. In one implementation, at least one of selected rules includes providing for: allowing no shooting; allowing no sprinting; using only secondary weapon; allowing only hip-fire; allowing jumping only; allowing no crafting of any items; allowing driving backwards only; and allowing no assistance from friendly non-player characters. In one implementation, downloading includes downloading one of the at least one of selected imports of rulesets or the at least one of the selected rules from the cloud. In one implementation, the method further includes browsing the at least one of selected imports on a software development kit of the platform. In one implementation, the method further includes browsing the at least one of selected imports on the cloud. In one implementation, the method further includes managing speedrun data including speedrun times within a computer system specially made for playing video games. In one implementation, the speedrun data is captured using the platform and stored on servers that are accessed over the Internet. In one implementation, the method further includes at least one of: displaying celebratory screen; displaying the speedrun times of the player; and displaying the speedrun times of competitors. In one implementation, the method further includes storing the speedrun data including at least one of the speedrun times, configurations, and media data on the cloud. In one implementation, the method further includes uploading the stored speedrun times, configurations, and media data to social media sites.

In another particular implementation, a speedrun timer system for providing a speedrun to be initiated by a player using an option in settings of a platform includes an import selector, a rule selector, a downloader, and a speedrun processor. The import selector selects at least one of installed imports of rulesets and default imports of rulesets. The rule selector selects at least one of installed rules and default rules. The downloader downloads one of the at least one of selected imports of rulesets or the at least one of the selected rules. The speedrun processor then (1) starts the speedrun, (2) determine whether at least one of the selected rules have been broken by the player, (3) apply one of time or input-related punishment when it is determined that the at least one of the selected rules have been broken, (4) determine whether criteria of the at least one of the selected rules and the at least one of the installed imports of rulesets are met; and (5) terminate the speedrun when it is determined that the criteria are met.

In one implementation, the system further includes a browser to browse the at least one of selected imports on a software development kit of the platform. In one implementation, the system further includes a storage unit to store the speedrun data including at least one of the speedrun times, configurations, and media data. In one implementation, the system further includes an uploader to upload the stored speedrun times, configurations, and media data to social media sites. In one implementation, the system further includes a display unit to display at least one of celebratory screen, the speedrun times of the player, and the speedrun times of competitors.

In yet another particular implementation, a non-transitory computer-readable storage medium storing a computer program to provide a speedrun timer on a platform is disclosed. The computer program includes executable instructions that cause a computer to: initiate a speedrun on the platform by a player using an option in settings of the platform; select at least one of installed imports of rulesets and default imports of rulesets; select at least one of installed rules and default rules; download one of the at least one of selected imports of rulesets or the at least one of the selected rules; starting the speedrun; determining whether at least one of the selected rules have been broken by the player; apply one of time or input-related punishment when it is determined that the at least one of the selected rules have been broken; determine whether criteria of the at least one of the selected rules and the at least one of the installed imports of rulesets are met; and terminate the speedrun when it is determined that the criteria are met.

In one implementation, the computer program includes executable instructions that cause a computer to store the speedrun data including at least one of the speedrun times, configurations, and media data on the cloud. In one implementation, the computer program includes executable instructions that cause a computer to upload the stored speedrun times, configurations, and media data to social media sites.

The above-described implementations may make the speedruns accessible to wider audience and may garner attention from the speedrun community which has gained a large following. In one implementation, the process 100 or system 200 includes a timer for speedruns and programmable splits (which can be modified), and is available to be used on any game title. Since speedruns may often involve racing, the players are put head-to-head in a game title to determine the fastest time. Thus, in one implementation, the speedrun timer process 100 or system 200 includes a safeguard to ensure that (1) all variables are accounted for, (2) the timer starts at the same time, and (3) the players are provided the fairest run possible.

The description herein of the disclosed implementations is provided to enable any person skilled in the art to make or use the present disclosure. Numerous modifications to these implementations would be readily apparent to those skilled in the art, and the principles defined herein can be applied to other implementations without departing from the spirit or scope of the present disclosure. Thus, the present disclosure is not intended to be limited to the implementations shown herein but is to be accorded the widest scope consistent with the principal and novel features disclosed herein. Accordingly, additional variations and implementations are also possible.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for providing a speedrun timer on a platform, the method comprising:
- receiving input of a player via an input device requesting a speedrun;
- downloading, to a first program code corresponding to the speedrun, a second program code indicating a rule;
- executing, after the downloading, the first program code;
- determining, upon execution of the first program code, that gameplay of the player has broken the rule; and
- updating the execution of the first program code to apply an input-related punishment that updates a mapping of controls of the input device to the execution of the first program code.

2. The method of claim 1, wherein the second program code comprises at least one of:
- types of runs;
- submitted templates of the player; and
- challenges of developers.

3. The method of claim 1, wherein second program code comprises instructions providing for at least one of:
- left-handed players in which all inputs are flipped;
- level-based speedruns where a level or stage is completed as quickly as possible;
- speedruns with inputs doubled;
- speedruns with inputs disabled;
- infinite health for a player or enemy;
- speedruns without being seen by enemies;
- developer-sourced speed runs; and
- speedruns in which all clips are emptied as soon as possible.

4. The method of claim 1, wherein the second program code comprises instructions providing for at least one of:
- allowing no shooting;
- allowing no sprinting;
- using only secondary weapon;

allowing only hip-fire;

allowing jumping only;

allowing no crafting of any items;

allowing driving backwards only; and allowing no assistance from friendly non-player characters.

5. The method of claim 1, wherein downloading comprises downloading second program code from a cloud network.

6. The method of claim 1, further comprising browsing at least one of selected imports on a software development kit of the platform.

7. The method of claim 1, further comprising browsing at least one of selected imports on a cloud network.

8. The method of claim 1, further comprising managing speedrun data including speedrun times within a computer system specially made for playing video games.

9. The method of claim 8, wherein the speedrun data is captured using the platform and stored on servers that are accessed over an Internet connection.

10. The method of claim 8, further comprising at least one of:

displaying celebratory screen;

displaying the speedrun times corresponding to the player; and displaying the speedrun times corresponding to competitors.

11. The method of claim 8, further comprising storing the speedrun data including at least one of the speedrun times, configurations, and media data on a cloud network.

12. The method of claim 1, wherein the mapping is updated by at least:

disabling a specified input control for a predetermined penalty duration;

remapping at least one input control to an alternative function;

requiring multiple activations of an input control to register a single in-game action; or adding additional input events upon activation of a specified input control.

13. A speedrun timer system for providing a speedrun to be initiated by a player using an option in settings of a platform, the system configured to:

receive input of a player via an input device requesting a speedrun;

download, to a first program code corresponding to the speedrun, a second program code indicating a rule;

execute, after the download, the first program code;

determine, upon execution of the first program code, that gameplay of the player has broken the rule; and update the execution of the first program code to apply an input-related punishment that updates a mapping of controls of the input device to the execution of the first program code.

14. The system of claim 13, further configured to browse at least one of selected imports on a software development kit of the platform.

15. The system of claim 13, further configured to store speedrun data including at least one of speedrun times, configurations, and media data.

16. The system of claim 13, further configured to upload stored speedrun times, configurations, and media data to social media sites.

17. The system of claim 13, further configured to display at least one of celebratory screen, speedrun times corresponding to the player, and speedrun times corresponding to competitors.

18. A non-transitory computer-readable storage medium storing a computer program to provide a speedrun timer on a platform, the computer program comprising executable instructions that cause a computer to:

receive input of a player via an input device requesting a speedrun;

download, to a first program code corresponding to the speedrun, a second program code indicating a rule;

execute, after the download, the first program code;

determine, upon execution of the first program code, that gameplay of the player has broken the rule; and update the execution of the first program code to apply an input-related punishment that updates a mapping of controls of the input device to the execution of the first program code.

19. The non-transitory computer-readable storage medium of claim 18, further comprising executable instructions that cause the computer to store speedrun data including at least one of speedrun times, configurations, and media data on a cloud network.

20. The non-transitory computer-readable storage medium of claim 19, further comprising executable instructions that cause the computer to upload stored speedrun times, configurations, and media data to social media sites.

* * * * *